March 5, 1929.    H. L. STANTON ET AL    1,704,350
ELECTRICAL CONNECTER
Filed Feb. 16, 1926
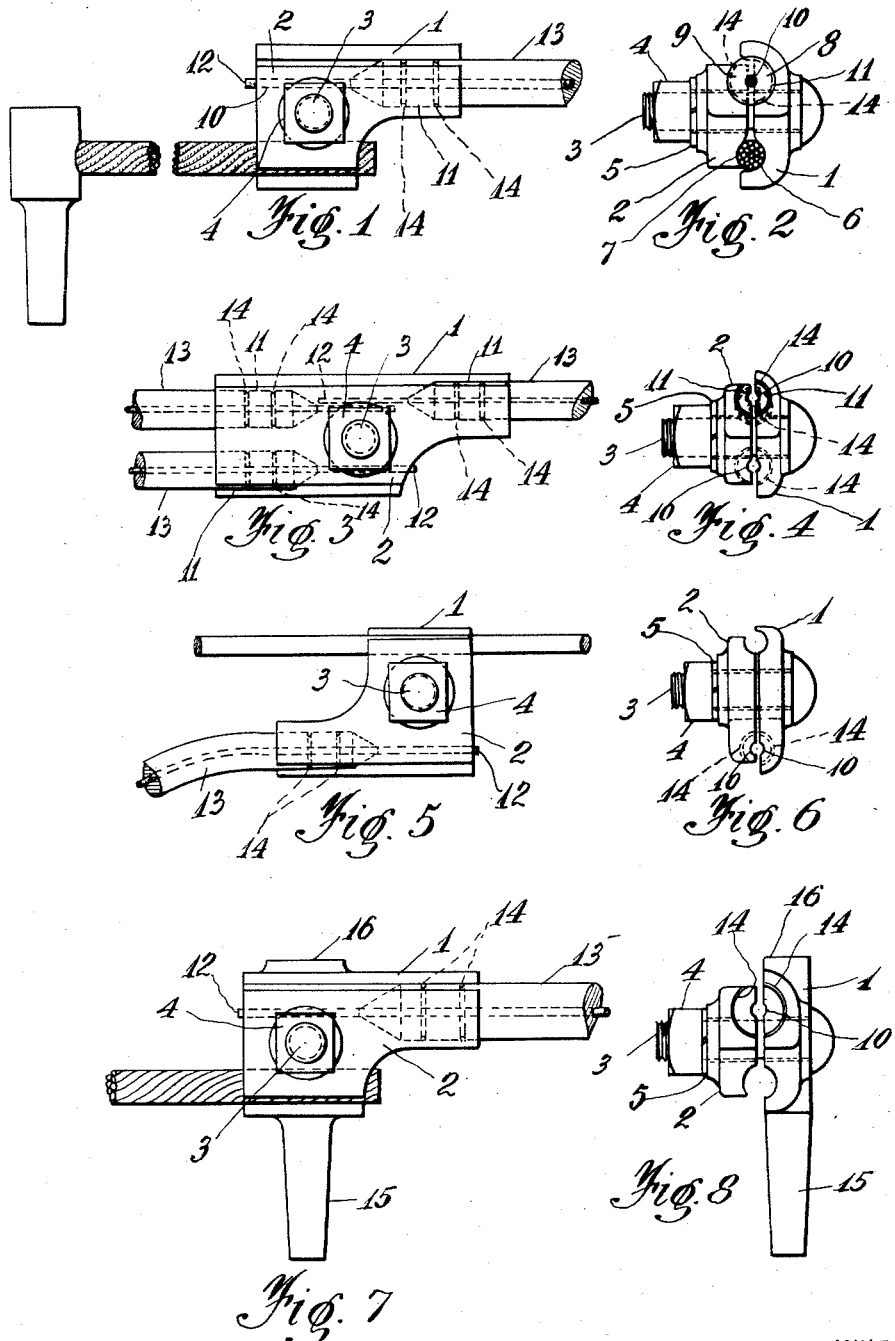

Patented Mar. 5, 1929.

1,704,350

UNITED STATES PATENT OFFICE.

HENRY LAMB STANTON, OF WILKINSBURG, AND ARCHIBALD McBRIDE CRAWFORD, OF PITTSBURGH, PENNSYLVANIA.

ELECTRICAL CONNECTER.

Application filed February 16, 1926. Serial No. 88,582. REISSUED

This invention relates to electrical connecters and more in particular to connecters used on electric power transmission lines.

The primary object of this invention is to provide a connecter for electric cables whereby the metallic core of the latter, as well as the outer insulation thereof, are properly clamped and supported. Another object of this invention is to provide a connecter whereby wires or cables of different diameters may be readily connected together, or disconnected. Still another object is to provide a connecter adapted to join together continuous lines, or to connect branch lines to a continuous line. Yet another object is to provide a connecter which has all the above named qualities and which is of simple construction, rapid application and which is adapted for cheap quantity manufacture. Additional features and advantages of this invention will appear from the following description considered in connection with the accompanying drawings forming a part of this application, and in which:—

Fig. 1 shows the application of our connecter for connecting together one bare stranded cable and one solid insulated wire.

Fig. 2 is an end view of Fig. 1.

Fig. 3 represents a connecter for connecting three insulated wires together.

Fig. 4 is an end view of Fig. 3, with the wires omitted.

Fig. 5 illustrates the tapping of an overhead line with a connecter of our invention.

Fig. 6 is an end view of Fig. 5, the wires being omitted.

Fig. 7 is a direct rail connecter for connecting a bare stranded wire and a solid insulated wire to a rail.

Fig. 8 is an end view of the connecter shown in Fig. 7.

As is well known to those versed in the art, electric cables, when subjected to swaying motions due to wind or other causes, are often broken at the places immediately adjacent either side of the portion of the metallic core of said cable clamped between a connecter; this is due especially to the sudden change in the rigidity of the cable occurring at the points where the insulation has been removed to make the proper engagement with the connecter.

We have found, however, that by making a connecter which is adapted to clamp a certain portion of the insulation, as well as the metallic core, of a cable, the breaking of the latter at points close to the connecter is greatly reduced, if not entirely eliminated. In other words, by clamping the insulation as well as the core, a connection is obtained which offers substantially the same uniform strength as the free portions of the cable.

Referring to Figs. 1 and 2, the connecter shown therein comprises a base clamp plate 1 and a smaller top plate 2, made of metal of good electrical conductivity, such as copper or bronze, which are held together by means of a bolt 3 having a nut 4 and a washer 5. In the juxtaposed faces of said plates are provided the straight grooves 6 and 7 and the composite grooves 8 and 9 comprising each a small portion 10 and the enlarged portion 11. These grooves are, of course, dimensioned to suit the size of wires or cables to which the connecter is applied. The small groove portions 10 are intended to receive the current carrying wire 12 of the cable 13, whereas the enlarged portions 11 serve to clamp the outer insulated portion of the cable. Ribs 14 are preferably provided inside the groove portions 11 to insure a better hold on the insulation and prevent accidental extraction of the cable when submitted to excessive longitudinal stresses. It will be noted also that the top plate 2 is made smaller than the base plate in order to economize material and reduce the weight of the connecter; for the same reasons, the lower right hand corner of the connecter is cut away in the manner shown in Fig. 1 especially.

The purpose of the connecter shown in Figs. 3 to 6 inclusive having been explained hereinabove, and their construction being very similar to that of the connecter shown in Figs. 1 and 2, their various parts have, therefore, been identified by the same reference numbers.

The connecter illustrated in Figs. 7 and 8 is especially intended for connecting wires and cables to the rails of electrical railways. The base plate 1 of this connecter is therefore, provided with a slightly tapered extension, or plug, 15 which is driven tight in an appropriate hole drilled and reamed in the rail to establish a good contact. To prevent any damage or deformation of the connecter, the latter is reinforced at the opposite side of the plug by a boss or strike-head 16 which is struck with a hammer when the connecter is to be driven in place on a rail. With these exceptions, the construction of this connecter is very similar to the one fully described above, and for that reason, the similar parts bear the same reference numbers.

As will be understood, as suggested herein, there may be slight changes made in the construction and arrangement of the details of this invention without departing from the field and scope of the same, and we intend to include all such variations, as fall within the scope of the appended claim in this application in which the preferred and most used forms of this invention have been disclosed.

We claim:—

In a connecter for connecting electric insulated cables and the like to a rail-way-rail, the combination of a base-plate; a top-plate; means for clamping said plates together, said plates having registering grooves provided with portions for engaging the cores and with other portions for engaging the insulation of said cables, and a tapered extension positioned on one of said plates and adapted to be driven for frictional engagement into said rail.

In testimony whereof we affix our signatures.

HENRY LAMB STANTON.
ARCHIBALD McBRIDE CRAWFORD.